United States Patent
Nagel et al.

(10) Patent No.: US 8,879,140 B2
(45) Date of Patent: Nov. 4, 2014

(54) SYSTEM AND METHOD FOR PROVIDING DC POWER TO AN OUTSIDE ELECTROCHROMIC MIRROR (OEC) USING A PULSE WIDTH MODULATED (PWM) INPUT

(75) Inventors: Gregory J. Nagel, Byron Center, MI (US); Robert R. Turnbull, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 99 days.

(21) Appl. No.: 13/468,078

(22) Filed: May 10, 2012

(65) Prior Publication Data

US 2012/0287496 A1    Nov. 15, 2012

Related U.S. Application Data

(60) Provisional application No. 61/485,162, filed on May 12, 2011.

(51) Int. Cl.
*G02F 1/153* (2006.01)
*H02M 7/217* (2006.01)
*G02F 1/163* (2006.01)

(52) U.S. Cl.
CPC ............... *H02M 7/217* (2013.01); *G02F 1/163* (2013.01)
USPC ........................................................ 359/267

(58) Field of Classification Search
CPC .......................... G02F 1/15–1/163; G09G 3/38
USPC ............... 359/265–275, 277, 245–247, 242; 345/49, 105; 250/70; 348/814, 817; 438/929; 349/182–186
See application file for complete search history.

(56) References Cited

U.S. PATENT DOCUMENTS

| | | |
|---|---|---|
| 5,451,822 A | 9/1995 | Bechtel et al. |
| 6,056,410 A | 5/2000 | Hoekstra et al. |
| 6,084,700 A * | 7/2000 | Knapp et al. ................... 359/265 |
| 6,089,721 A | 7/2000 | Schierbeek |
| 6,229,434 B1 | 5/2001 | Knapp et al. |
| 6,229,435 B1 | 5/2001 | Knapp et al. |
| 6,291,905 B1 * | 9/2001 | Drummond et al. ......... 307/10.1 |
| 6,396,408 B2 | 5/2002 | Drummond et al. |
| 7,427,150 B2 | 9/2008 | Carter et al. |
| 8,169,684 B2 | 5/2012 | Bugno et al. |
| 2010/0018654 A1 * | 1/2010 | Skinner et al. ............. 160/84.02 |

* cited by examiner

Primary Examiner — Alicia M Harrington
Assistant Examiner — Cara Rakowski
(74) Attorney, Agent, or Firm — Price Heneveld LLP; Scott P. Ryan

(57) ABSTRACT

A power supply for supplying direct current (DC) power from a pulse width modulated (PWM) source includes a connector configured to be in electrical communication with a PWM power source. A hold-up circuit is in electrical communication with the connector and is configured to convert electrical power supplied from the PWM power source to DC power. This DC power is supplied to a drive circuit where a microcontroller is configured to control the drive circuit by supplying the DC power from the drive circuit to a load.

18 Claims, 2 Drawing Sheets

US 8,879,140 B2

SYSTEM AND METHOD FOR PROVIDING DC POWER TO AN OUTSIDE ELECTROCHROMIC MIRROR (OEC) USING A PULSE WIDTH MODULATED (PWM) INPUT

CROSS-REFERENCE TO RELATED APPLICATION

This application claims priority to and the benefit under 35 U.S.C. §119(e) of U.S. Provisional Patent Application No. 61/485,162, entitled "SYSTEM AND METHOD FOR PROVIDING DC POWER TO AN OUTSIDE ELECTROCHROMIC MIRROR (OEC) USING A PULSE WIDTH MODULATED (PWM) INPUT," filed on May 12, 2011, which is hereby incorporated by reference.

FIELD OF THE INVENTION

The present invention relates generally to an electrochromic element driver circuit and more particularly to a driver for providing DC power to an electrochromic element, derived from a PWM output on the vehicle.

BACKGROUND OF THE INVENTION

Demands for communication systems within vehicles have increased with greater use of electronic modules that perform a multitude of vehicle functions. For example, a control module may be used within a vehicle door to control such functions as outside mirror motors, turn signal indicators, glass heaters, security lights, and vehicle sensors. By connecting the control module to a vehicle bus, the control module helps to reduce the amount of hard wired connections made to each of these various components.

SUMMARY OF THE INVENTION

An embodiment of the present invention is directed to a power supply for supplying direct current (DC) power from a pulse width modulated (PWM) source and includes a connector configured to be in electrical communication with a PWM power source and least one hold-up circuit in electrical communication with the connector. The at least one hold-up circuit is configured to convert electrical power supplied from the PWM power source to DC power, and supply the DC power to a drive circuit. A microcontroller is configured to control the drive circuit by supplying the DC power from the drive circuit to a load. In another embodiment, a vehicular power supply is used for supplying DC power from a pulse width modulated power source and includes a connector configured to be in electrical communication with a PWM power source provided by the on/off keying of a voltage source in a vehicle. A PWM power source is provided by on/off keying (OOK) of a voltage source in the vehicle. A first hold-up circuit converts the PWM power source to a DC power supplied to at least one microcontroller and a second hold-up circuit for converts the PWM power source to DC power source supplied to an electrochromic (EC) mirror drive circuit. The microcontroller operates to control the drive circuit by supplying DC power from the drive circuit to an EC mirror based upon the pulse width of the PWM power source. Still another embodiment of the invention includes a method for supplying DC power from a PWM source comprises the step of receiving PWM power from a PWM power source to at least one hold-up circuit and converting the PWM power source to DC power source at the at least one hold-up circuit. DC power is supplied to a drive circuit and the drive circuit is controlled for supplying a source of DC power to a load.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
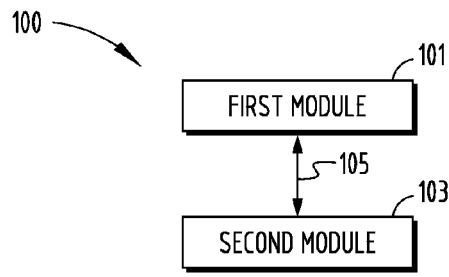
FIG. 1 is block diagram showing the configuration of components common to some of the embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE PREFERRED EMBODIMENTS

Before describing in detail embodiments that are in accordance with the present invention, it should be observed that the embodiments reside primarily in combinations of method steps and apparatus components related to a system and method for providing a DC power to a load from a PWM power source. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of the system and method for providing DC power from a PWM power source as described herein. The non-processor circuits may include, but are not limited to signal drivers, clock circuits, power source circuits, and user input devices. As such, these functions may be interpreted as steps of a method to perform providing DC power to a load from a PWM power source. Alternatively, some or all functions could be implemented by analog hardware or a state machine that has no stored program instructions, or in one or more application specific integrated circuits (ASICs), in which each function, or some combinations of certain of the functions, are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Many vehicles often have one or more dedicated buses for communicating electrical signals related to the power train as well as a LIN, CAN or J1850 type system bus for managing power demands within the vehicle. When using this type of system, various electronic modules separately receive power from a power supply of the vehicle, e.g. the vehicle battery or ignition. Thus, in addition to the bus wiring, separate wiring must be run to each module as well as other electrical components for providing the necessary power. As described in U.S. Pat. No. 6,229,434 to Gentex Corporation, which is herein incorporated by reference in its entirety, due to security concerns, many manufacturers have not connected an electronic module, which is on the vehicle bus, to the vehicle's outside rearview mirror.

An outside vehicular mirror typically uses a significant number of discrete wires for enabling independent control of all the functional components in the mirror assembly. Those skilled in the art will recognize that the electrochromic glass, used in the outside mirror, requires a drive voltage between 0 to 1.5 volts for providing various reflectance levels of the EC glass element. In cases where manufactures wish to retro-fit an outside mirror with EC glass, the existing control module and wire harness sometimes do not have the necessary provisions for providing the necessary outside electrochromic element drive power. Examples of EC elements are taught in U.S. application Ser. No. 12/832,838 and U.S. Pat. No. 7,427,150 both commonly assigned to Gentex Corporation and hereby incorporated by reference in their entireties.

Referring now to the drawings, FIG. 1 illustrates a block diagram showing the configuration of components common to some of the embodiments of the invention. The vehicular module type system 100 includes a first module 101 that is connected to a second module 103 by an interface consisting of an electrical conductor 105. A DC voltage and current are supplied over electrical conductor 105 between the first and second modules. Optionally, the electrical conductor 105 can also be used to transmit data and other communications information. Those skilled in the art will recognize that any of a number of well-known coding schemes for data transmission could be employed over the electrical conductor 105 including, but not limited to, PWM or asynchronous serial data transmission.

Figure 2:
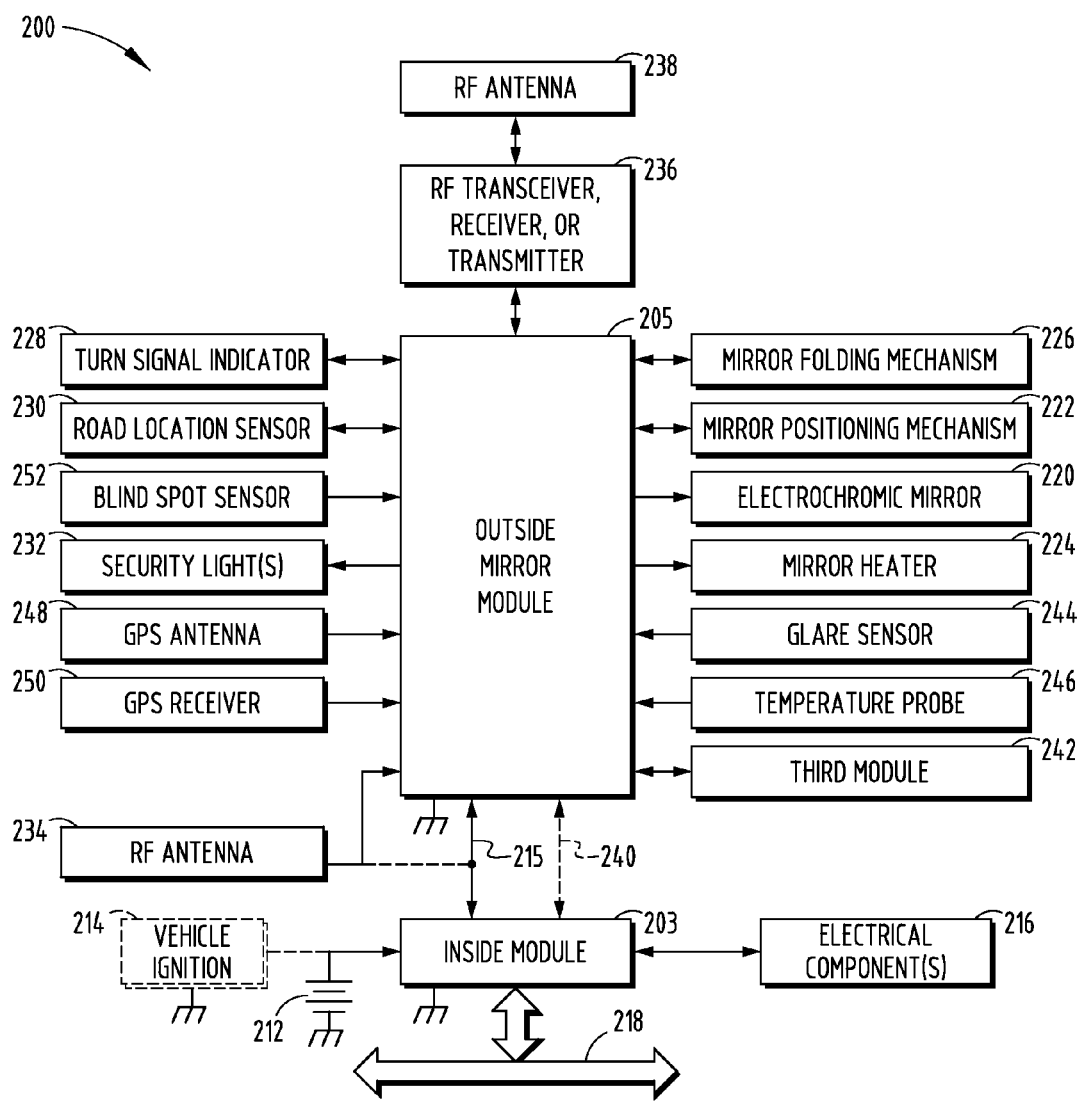
FIG. 2 is a block diagram illustrating how various electrical modules may be used for providing DC power to an outside rearview mirror assembly, according to an embodiment of the invention.

FIG. 2 is a block diagram illustrating how various electrical modules in the present invention may be used for providing DC power to an outside rearview mirror assembly. As shown in FIG. 2, the vehicular electrical module system 200 uses a second module that is used in connection with an outside mirror module 205. The outside mirror module can typically be used in connection with an outside electrochromic mirror element (OEC). The inside module 203 may be any electronic module located inside the vehicle, such as an inside vehicle door or other convenient location. The inside module 203 receives power from an on-board vehicle battery 212 or alternatively from the vehicle ignition 214.

An inside module 203 may be interfaced with one or more electrical components 216 depending upon the location of module 203. For example, if the inside module 203 is a door module, it would interface with door lock/unlock and window open/close switches and/or door lock and window actuators and optionally, seat movement switches, door open/close switches, a trunk release switch, a gas tank door release switch, mirror position switches, and heater switches. If the inside module 203 were used in connection with an inside rearview mirror module, it will typically interface with electrical components 216 such as an inside electrochromic mirror, an electronic compass, light sensors, a temperature sensor, a remote keyless entry (RKE) receiver, a global positioning system (GPS) receiver, a tire pressure monitoring receiver, a garage door opener transmitter, etc. The inside module 203 may additionally be coupled to a vehicle system bus such as, but not limited to, a LIN, CAN, Ethernet, Bluetooth, Wi-Fi, Flexray, MOST or J1850 bus 218.

Amongst other things, the outside mirror module 205 can be used to control and/or otherwise convey command signals to a plurality of electrical components that are disposed within or on the housing of the outside rearview mirror assembly. Such electrical components may include, but are not limited to: an electrochromic (EC) mirror 220; a mirror positioning mechanism 222; a mirror heater 224; an automatic mirror folding mechanism 226; a turn signal indicator 228; a road/lane edge location sensor 230; one or more security lights 232; an RF antenna 234; an RF transceiver, receiver, or transmitter 236 having an antenna 238; glare detection and/or ambient light sensor 244; a temperature probe 246; a GPS antenna 248; a GPS receiver 250; and a blind spot detector 252.

Further, the outside mirror module 205 may be coupled to the inside module 203 by vehicle ignition 214 that are configured using a single electrical conductor. The inside module 203 works to supply power and/or data signals to the outside mirror module 205 over this single electrical conductor. In other applications, the outside mirror module 205 may also transmit data back to inside module 203 via ignition 214. Such data may include any RF signals received by antenna 234 (which may include tire pressure information, remote keyless entry (RKE) commands, GPS data, etc.), data received by receiver 236, road/lane edge location sensor output signals, glare detection signals, blind spot detection signals, outside temperature, and/or any data transmitted from a third electronic module 242, which may be coupled to the outside mirror module 205. Although the outside mirror module 205 need not be totally dependent upon inside module 203 for the supply of operating power, supplying power through the use of a separate power wiring connection from module 205 directly to vehicle battery 212 or vehicle ignition 214 is often too expensive and/or impractical to implement. In an alternative embodiment, the module 205 may also receive its operating PWM power from the inside module 203 via a second independent electrical conductor 240. In this configuration, the modules 203 and 205 may communicate directly over conductor 214 without the power that is supplied to outside mirror module 205 over the conductor 214.

Figure 3:
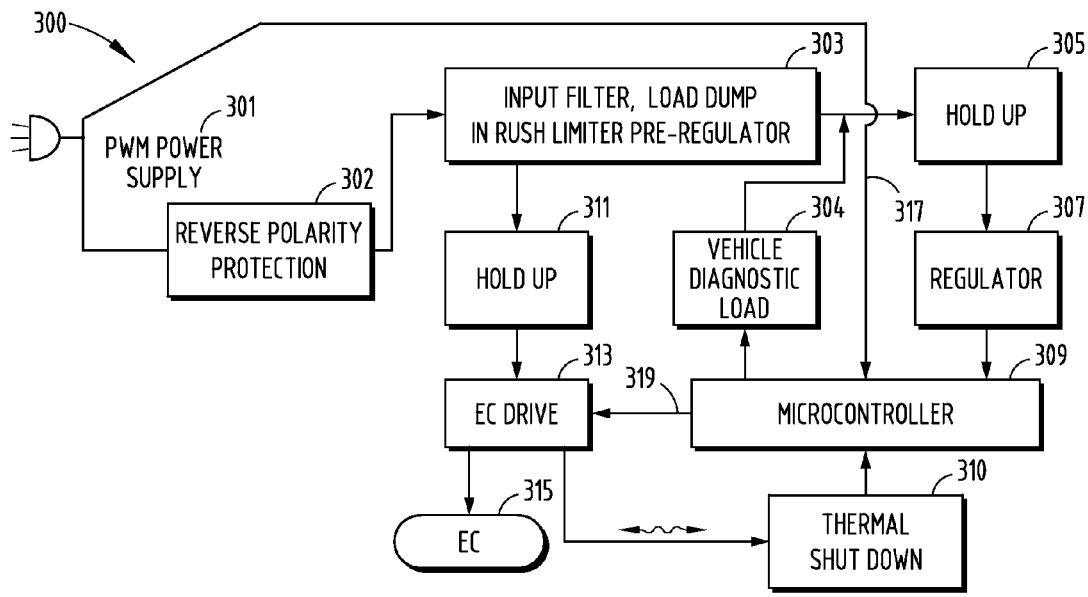
FIG. 3 is a block diagram of the system for providing DC power to an electrochromic mirror or window element using a PWM power source according to an embodiment of the invention.

FIG. 3 illustrates a block diagram of a system for providing DC power to an OEC mirror element using a PWM input signal. The system 300 obtains a PWM power source 301 typically from an inside module such as, but not limited to, a door module like that shown in FIG. 1. In order to obtain a PWM voltage, a port on the module may be switched or toggled between an on and off state in an on/off keying (OOK) mode to provide a PWM signal source having some predetermined amplitude and frequency. The toggled voltage might typically be a vehicle ignition voltage such as about 12VDC that supplies power directly to the module.

The PWM power source 301 is supplied to a reverse polarity protection circuit 302 such as one or more solid state devices such as a diode. This voltage is then supplied to an input filter 303 for eliminating any high frequency transients that might be present on the supply line. The input filter also operates to control load dump issues and to limit current to circuit components. For example, those skilled in the art will recognize that the term "load dump" can refer to the disconnection of the vehicle's battery or load from the alternator while the battery is being charged. Due to such a disconnection of the load or battery, the alternator can produce a great surge in voltage. In some situations, the peak voltage of this surge may be as high as approximately 120 volts and the surge may take up to approximately 400 ms to decay. A vehicle diagnostic load 304 is controlled by a microcontroller 309 and works to determine when the input filter 303 is not operating properly. Diagnostic load 304 is turned on at power-up and for a predetermined time thereafter. The vehicle uses this current draw to detect the presence of the OEC module. Hence, the input filter 303 also acts to protect the system 300 by disconnecting and isolating the circuit in cases where the voltage transients exceed a predetermined level. Further, because of the design configuration of the input filter 303, the voltage supplied by the input filter 303 will also be current limited for adding another level of fault protection to the EC element 315 as described hereinafter. The EC element 315 can be a mirror or window wherein the DC voltage is supplied to control a transmission state of the EC element 315. Those skilled in the art will recognize that the DC voltage supplied to the outside EC element 315 can be proportional to and/or based upon ambient and glare readings from an interior EC element or sensor or depend upon a drive signal used in connection with an interior EC element.

An output of the input filter 303 is the supplied to a first hold-up circuit 305. The hold-up circuit 305 is configured to allow a constant voltage and current to be supplied to a regulator 307 and the microcontroller 309 during times which the PWM supply voltage is at zero. More specifically, the hold-up 305 can include one or more storage devices such as capacitors. The storage devices are to utilize the PWM power source 301 for supplying the necessary DC operating voltage to the microcontroller 309. The storage device is charged to a predetermined operating voltage level in order to subsequently maintain operation of the microcontroller 309 during the AC or square wave cycling of the PWM input. Thereafter, the voltage is applied to a regulator 307 where the DC voltage can be reduced in amplitude for supplying the correct DC power to the microcontroller 309. Typically, the regulator 309 is an electrical regulator designed to automatically maintain an approximately constant voltage level at a $V_{cc}$ input of the microcontroller 309. The regulator 307 may be a "feed-forward" design or alternatively may include one or more negative feedback control loops. In this application, the regulated voltage supplied to the microcontroller 309 will typically be approximately 3.3 VDC. If the microcontroller 309 is operated in a manner or in an ambient environment such that it can cause a fault or damaging condition, a thermal shut down circuit 310 works to cease operation of EC driver 313 until such temperature is reduced.

As further seen in FIG. 3, an output of the input filter 303 is also supplied to a second hold-up circuit 311. The second hold-up circuit 311 works similarly to the first hold-up circuit 305, which enables an approximately constant voltage and current to be supplied from the square wave output of input filter 303. The DC output from the second hold-up circuit 311 is provided to an electrochromic drive circuit 313, which is used to provide a predetermined voltage to a load such as an OEC element 315. The EC drive circuit 313 is a constant-voltage circuit that is interposed between the second hold-up 311 that functions to compensate for variations of an output level of the PWM power supply 301. Those skilled in the art will further recognize a PWM power source can be used in order to stabilize coloration and bleaching operations of the OEC element 315.

In normal use, the voltage required to operate the OEC element 315 will be in a range between approximately 0 to 1.5 VDC, which enables the EC element 315 to color or tint at a certain level. In order to control the voltage applied to the EC element 315, the microcontroller 309 includes a look up table for storing various pulse width values. Alternatively in another embodiment, a memory can extend or be configured to be used by the microcontroller 309 where the EC element 315 is an OEC. In operation, the microcontroller 309 works to first determine the pulse width from the PWM input signal on the control input 317. This information is then used with the look up table for providing the appropriate control signal via control line 319 to the EC drive circuit 313. The EC drive circuit 313 uses the control signal to provide a precisely regulated DC voltage from the EC drive circuit 313 to the EC element 315 for controlling mirror reflectance.

Figure 4:
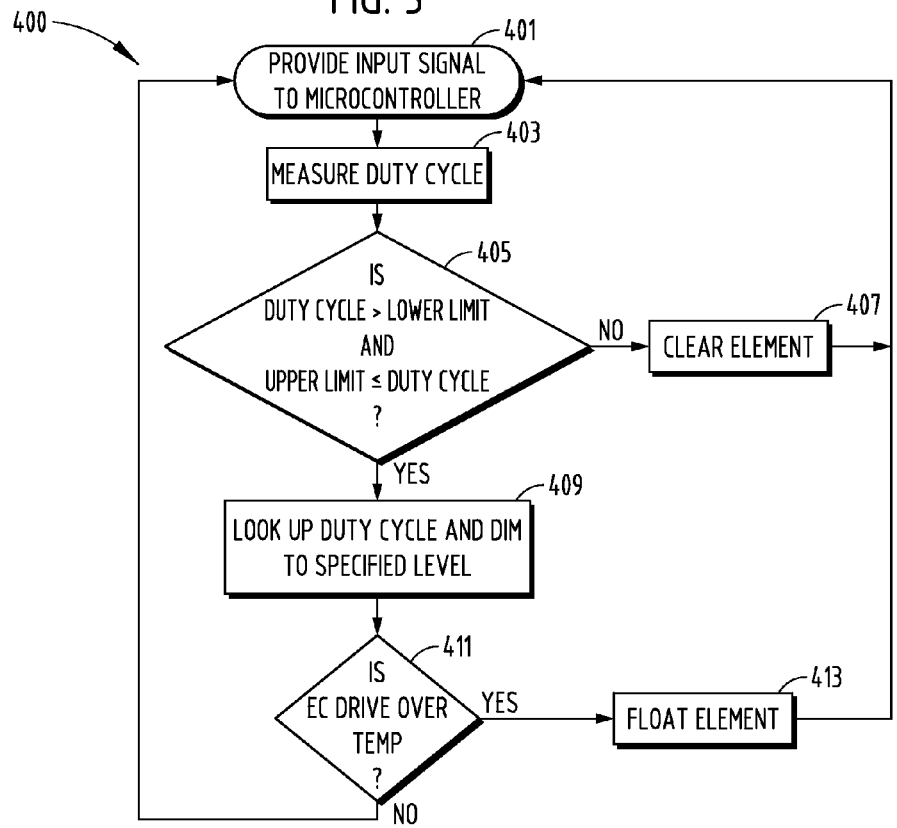
FIG. 4 is a flow chart diagram illustrating a fault prevention method used by the microcontroller for proving the correct DC voltage to the EC element, according to an embodiment of the invention.

FIG. 4 is a flow chart diagram illustrating a fault prevention method used by the microcontroller for providing the correct DC voltage to the EC element, according to an embodiment of the invention. The fault prevention method 400 includes providing an input signal that is provided as an input to the microcontroller from the input filter 401. The duty cycle, i.e. the time spent in an active state, of the DC voltage provided to the circuit is then measured 403. A determination is then made if the duty cycle is greater than a lower limit or less than of equal to an upper limit 405. The upper duty cycle limit may include 100%. If the duty cycle is within this predetermined range, the DC voltage is determined using a look-up table such that a DC voltage that corresponds to the duty cycle is supplied to the EC element, and the EC element is dimmed to a specified level 409. If the DC voltage is outside of this range, then the EC element is cleared 407, i.e., the DC voltage provided to the element is reduced to approximately 0 VDC and the process begins again 401. If the voltage is below the limited, a determination is made if the EC element is over a predetermined temperature 411. If not the process begins again 401, however if it is over the temperature threshold, the element is floated 413 i.e. not driven high or low where it is put in a high impedance state where the process begins again 401.

Many vehicle manufacturers have existing wire harnesses that do not include provisions for an OEC drive signal. However, in some instances, an inside vehicle module does have the capability for providing vehicle power that can be turned off and on to create a PWM power source. One type of power source that is typically provided to the OEC mirror is a PWM signal voltage. This type of PWM voltage used to control mirror reflectance has a disadvantage of increased power dissipation because of the on/off nature of the switching required to produce PWM power. Although some prior art EC technology was incapable of effectively controlling color and bleaching in the EC element due to light transmittance and temperature variations, these shortcomings have been overcome in current EC technology. Consequently, some OEC mirrors used various power supply configurations that supply a PWM square wave signal to the EC element. However, this is not the only solution. Consequently, new approaches can be used when retrofitting OEC mirrors to existing vehicular technology. Thus, an embodiment of the present invention is configured to convert a pulse width modulated vehicle power source to an OEC DC voltage with its amplitude based on the incoming PWM power source pulse width. This approach also avoids the extra power dissipation that occurs if the element is repetitively charged and discharged by a square wave drive signal.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A system for supplying DC power derived from a pulse width modulated (PWM) source comprising:
   a connector configured to be in electrical communication with a PWM power source;
   at least one hold-up circuit in electrical communication with the connector, the at least one hold-up circuit comprising:
   a first hold-up circuit configured to convert a PWM power supplied from the PWM power source to a first DC power and supply the first DC power to a microcontroller; and
   a second hold-up circuit configured to convert the PWM power supplied from the PWM power source to a second DC power, and supply the second DC power to a drive circuit; and
   wherein the microcontroller is configured to control the drive circuit by regulating a DC voltage from the drive circuit to a load, wherein the load is an electrochromic (EC) mirror element.

2. A system for supplying DC power as in claim 1, wherein the microcontroller is configured to control the DC voltage from the drive circuit based on the pulse width of the PWM power.

3. A system for supplying DC power as in claim 2, wherein the microcontroller is configured to control the DC voltage from the drive circuit based on stored reference data corresponding to the pulse width of the PWM power.

4. A system for supplying DC power as in claim 1, wherein the at least one hold-up circuit includes at least one capacitive device for storing the PWM power supplied by the PWM power source.

5. A system for supplying DC power as in claim 1, wherein the DC voltage supplied to the load is in a range from approximately 0 volts to 1.5 volts.

6. A system for supplying DC power as in claim 1, wherein the DC voltage supplied to the load is based upon light readings received at an interior electrochromic (IEC) mirror.

7. A system for supplying DC power as in claim 6, wherein the light readings are based upon both ambient light and glare light.

8. A system for supplying DC power as in claim 1, wherein the load is an outside electrochromic (EC) mirror element.

9. A vehicular power supply system for supplying DC power derived from a pulse width modulated (PWM) power source comprising:
   a connector configured to be in electrical communication with a PWM power source provided by an on/off keying of a voltage source in a vehicle;
   a first hold-up circuit for converting a PWM power from the PWM power source to a first DC power supplied to at least one microcontroller;
   a second hold-up circuit for converting the PWM power to a second DC power supplied to a drive circuit; and
   wherein the at least one microcontroller is configured to control the drive circuit by regulating a DC voltage from the drive circuit to an EC mirror based upon a pulse width of the PWM power.

10. A vehicular power supply system as in claim 9, wherein the first hold-up circuit and the second hold-up circuit include at least one capacitive device for storing power supplied by the PWM power source.

11. A vehicular power supply system as in claim 9, wherein the DC voltage supplied to the EC mirror is in a range from approximately 0 volts to 1.5 volts.

12. A vehicular power supply system as in claim 9, wherein the DC voltage supplied to the EC mirror is based upon light readings received at an interior electrochromic (IEC) mirror.

13. A vehicular power supply system as in claim 9, wherein the EC mirror is an outside EC (OEC) mirror mounted to a vehicle door.

14. A method for supplying DC power derived from a pulse width modulated (PWM) source comprising the steps of:
   receiving PWM power from a PWM power source;
   converting the PWM power to a first DC power;
   supplying the first DC power to a microcontroller;
   converting the PWM power to a second DC power;
   supplying the second DC power to a drive circuit; controlling the drive circuit for supplying a DC voltage to a load,
   utilizing at least one capacitive device in at least one hold-up circuit for storing power supplied by the PWM power source,
   utilizing at least one of the at least one hold-up circuits for converting the PWM power to the first DC power supplied to the microcontroller, and
   utilizing an electrochromic EC mirror element as the load.

15. A method for supplying DC power as in claim 14, further comprising the step of:
   utilizing the microcontroller for controlling the DC voltage from the drive circuit based on the pulse width of the PWM power.

16. A method for supplying DC power as in claim 14, further comprising the step of:
   supplying the DC voltage to the load in a range between approximately 0 volts to 1.5 volts.

17. A method for supply DC power as in claim 14, wherein the load is an EC mirror, and the method further comprising the step of:

supplying the second DC power to the EC mirror based upon light readings received at an interior electrochromic (IEC) mirror.

18. A method for supplying DC power as in claim 14, further comprising the step of:

utilizing an outside electrochromic (OEC) mirror element as the load.

\* \* \* \* \*